SIGNAL INFORMATION DETECTION CIRCUITRY

Filed July 31, 1961 8 Sheets-Sheet 1

INVENTOR:
Eduardo T. Ulzurrun
By Louis A. Kline
John J. Matlago
Nathan Cass
His Attorneys Dec. 14, 1965 E. T. ULZURRUN 3,223,972

SIGNAL INFORMATION DETECTION CIRCUITRY

Filed July 31, 1961 8 Sheets-Sheet 2

INVENTOR:
Eduardo T. Ulzurrun

By Louis A. Kline
John J. Matlago
Nathan Cass

His Attorneys

Dec. 14, 1965 E. T. ULZURRUN 3,223,972

SIGNAL INFORMATION DETECTION CIRCUITRY

Filed July 31, 1961 8 Sheets-Sheet 3

INVENTOR:
Eduardo T. Ulzurrun
By Louis A. Kline
John J. Matlago
Nathan Cass
His Attorneys Dec. 14, 1965 E. T. ULZURRUN 3,223,972

SIGNAL INFORMATION DETECTION CIRCUITRY

Filed July 31, 1961 8 Sheets-Sheet 4

INVENTOR:
Eduardo T. Ulzurrun
By Louis A. Kline
John J. Maclago
Nathan Cass
His Attorneys Dec. 14, 1965 E. T. ULZURRUN 3,223,972

SIGNAL INFORMATION DETECTION CIRCUITRY

Filed July 31, 1961 8 Sheets-Sheet 5

Eduardo T. Ulzurrun

By Louis A. Kline
John J. Matlago
Nathan Cass
His Attorneys

Dec. 14, 1965 E. T. ULZURRUN 3,223,972

SIGNAL INFORMATION DETECTION CIRCUITRY

Filed July 31, 1961 8 Sheets-Sheet 6

INVENTOR.
Eduardo T. Ulzurrun
Louis A. Kline
By John J. Matlago
Nathan Cass
His Attorneys INVENTOR:
Eduardo T. Ulzurrun
By Louis A Kline
John J. Matlago
Nathan Cass
His Attorneys Dec. 14, 1965 E. T. ULZURRUN 3,223,972

SIGNAL INFORMATION DETECTION CIRCUITRY

Filed July 31, 1961 8 Sheets-Sheet 8

INVENTOR.
Eduardo T. Ulzurrun

By Louis A. Kline
John J. Matlago
Nathan Cass
His Attorneys

United States Patent Office 3,223,972
Patented Dec. 14, 1965

3,223,972
SIGNAL INFORMATION DETECTION CIRCUITRY

Eduardo T. Ulzurrun, Hollywood, Calif., assignor to The National Cash Register Company, Dayton, Ohio, a corporation of Maryland Filed July 31, 1961, Ser. No. 128,086
20 Claims. (Cl. 340—146.3)

This invention relates generally to means and methods for extracting information from a signal waveform and, more particularly, to means and methods which may advantageously be employed in a character recognition system for extracting character identification information from a signal waveform obtained as a result of the scanning of one or more printed characters.

In recent years, considerable research and development has been undertaken in the search for improved character recognition systems which are capable of reading conventional printed information. The need for such character recognition systems has arisen because of the importance in modern day business operations of being able to feed printed information directly to computers and other similar equipment without the need for converting the printed information into a special computer code, as is otherwise necessary. One of the most difficult problems which the art has encountered in the search for a practical character recognition system, however, is in providing a capability for reliably and accurately reading relatively poor quality printing on ordinary paper stock. Such a capability is of vital importance, since many business machines are most limited as to the quality of printing which they can provide without expensive modifications. For example, the conventional wheel-type printing equipment employed on many business machines produces printing in which the weight, uniformity, and width of print may vary considerably and, in addition, ink splatter and/or smudges are to be expected. Furthermore, the quality of paper stock which is employed for use in such business machines presents additional problems, since variations in shading as well as foreign particles and other extraneous marks in the paper stock must also be reckoned with and distinguished from useful character information.

As is to be expected, the burden of overcoming deficiences in printing and paper stock quality falls chiefly on the detection means which is to be employed in the character recognition system. Accordingly, it is the major object of the present invention to provide improved means and methods for extracting information from a signal waveform, with particular emphasis on detection means for use in a character recognition system.

Another object of the present invention is to provide detection means for use in a character recognition system, said detection means being capable of accurately and reliably detecting character information even though the printing and paper stock is of relatively poor quality.

A further object of the present invention is to provide detection means for use in a character recognition system, said detection means providing a variable clipping level for automatically compensating for variations in paper noise and/or ink noise, the former being caused by foreign particles in the paper stock and the latter being caused by ink splatter.

Still another object of the present invention is to provide detection means, in accordance with any or all of the foregoing objects, which is capable of accurately locating the center of a character segment over a wide range of segment widths and printing weights.

Yet another object of the present invention is to provide detection means, in accordance with any or all of the foregoing objects, which is capable of distinguishing between character segments and other extraneous marks or smudges which may be present on the paper.

An additional object of the present invention is to provide detection means, in accordance with any or all of the foregoing objects, which is relatively simple, compact, and inexpensive.

In order to illustrate how the above objects are achieved by the present invention, the construction and arrangement of typical detection means in accordance with the invention will be illustrated as designed for use in an optical character recognition system of the type disclosed in the commonly assigned copending patent application for a character recognition system, Serial No. 122,126, filed July 6, 1961, in the names of Richard K. Gerlach, Frank R. Schmid and Edward P. Bucklin, Jr. It is to be understood, however, that the detection means of the present invention may advantageously be employed not only in this particular character recognition system, but also, in any other character recognition system or any other type of system in which the features achieved by the present invention are desired.

As typically employed in the optical character recognition system of the aforementioned copending patent application, the detection means of the present invention has applied thereto a plurality of signal waveforms derived from a corresponding plurality of scanning apertures. In the illustrative embodiment to be described herein, the detection means first normalizes each signal waveform to a standard black-white level. The normalized signal waveforms are then automatically clipped by a predetermined percentage (e.g. 15%) based on the instantaneous black-white level to eliminate paper noise, and then, in order to eliminate ink noise, are next automatically clipped at each instant by a predetermined percentage (e.g. 15%) based on the maximum amplitude of the most recent information signal seen by any of the scanning apertures. Character information is then extracted from predetermined ones of the resultant signal waveforms by differentiating each such signal waveform, and then generating character information output signals in response to predetermined characteristics of the differentiated waveform, which characteristics are chosen so that character segments may readily be distinguished from extraneous marks or smudges.

The specific nature of the present invention as well as other advantages, objects and uses thereof will become apparent to those skilled in the art as disclosure is made in the following detailed description of the typical embodiment of the present invention illustrated in the accompanying drawings in which.

Like numerals designate like elements throughout the figures of the drawings.

As mentioned previously, a typical embodiment of the detection means of the present invention will be illustrated as designed for use in a character recognition system of the type disclosed in the aforementioned copending patent application. Therefore, in order to permit the present invention to be better understood, the character recognition system disclosed in the aforementioned patent application will first be generally described and then it will be shown how the detection means in accordance with the present invention may advantageously be incorporated therein.

Figure 1:
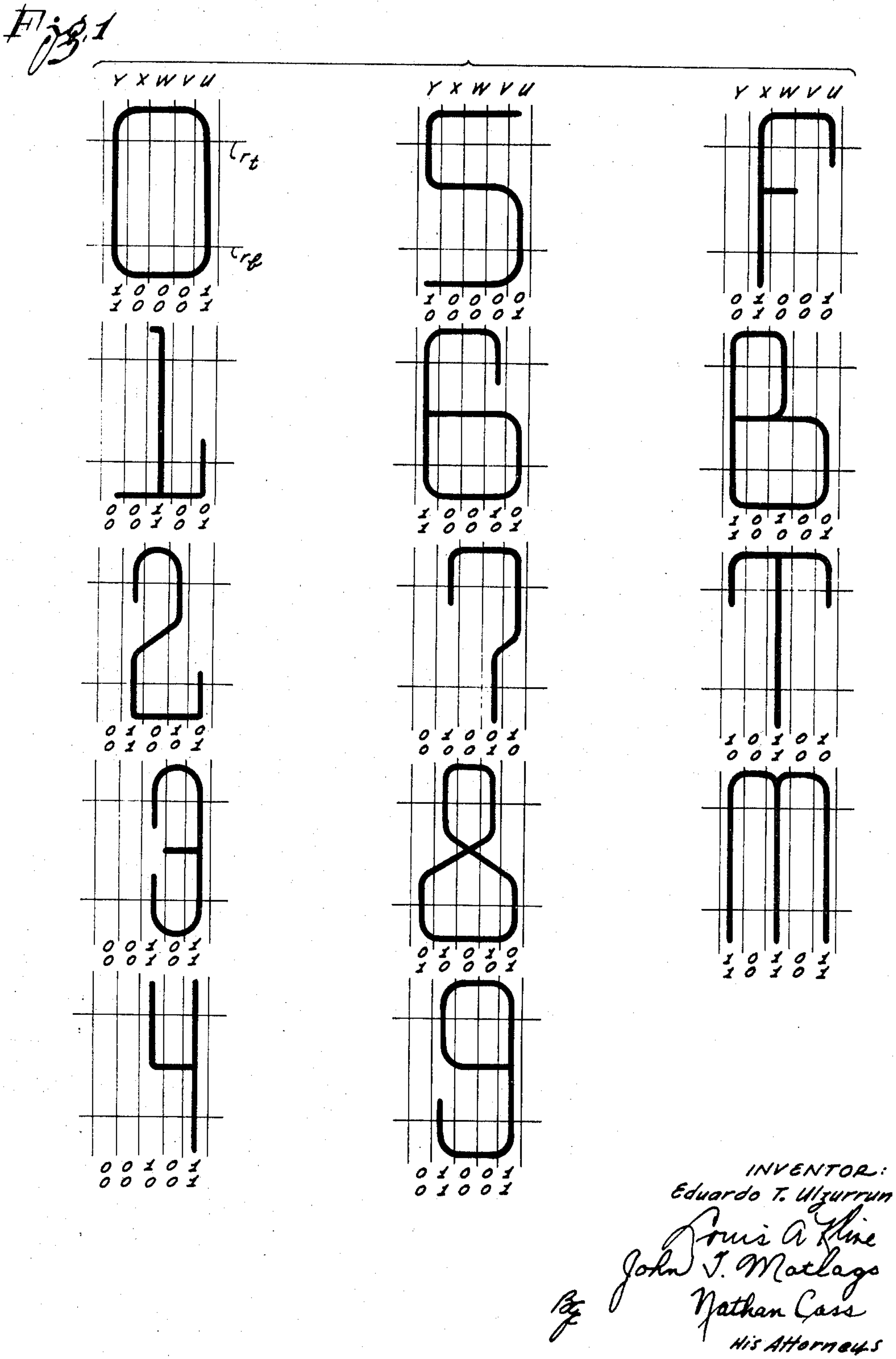
FIG. 1 shows a plurality of typical stylized characters used in a type of character recognition system which may advantageously employ the detection means of the present invention.

Referring to FIG. 1, fourteen stylized characters are illustrated, such as may be employed in the character recognition system of the aforementioned patent application. As shown in FIG. 1, ten-digit characters "0" through "9" and four alphabetical characters "F," "B," "T," and "M" are provided. Each character is divided into five vertical zones U, V, W, X, and Y, one or more of which zones contain character information in the form of vertical segments or lines used in forming the character. It will be understood that the lines in FIG. 1 designating the zones, U, V, W, X, and Y, are provided merely for illustrative purposes, and would not appear on actual printed characters.

The horizontal paths in FIG. 1 designated $r_t$ and $r_b$ passing through the top and bottom halves of each character, such as the character "0", indicate the two properly located scanning paths across zones U, V, W, X, and Y for which the presence or absence of a vertical segment in each zone is detected in order to obtain character information from which the character can be identified. If the presence of a vertical character segment in a zone is designated as a binary "1," and the absence of a character segment in a zone is designated as a binary "0" then, if a character is scanned along the top and bottom paths $r_t$ and $r_b$ as indicated, a five-digit binary number will be obtained for each path as shown below each character in FIG. 1. The two five-digit binary numbers thus obtained may be considered as a ten-digit binary number, the stylizing of the characters in the system being such that a different ten-digit binary number is obtained for each character.

Figure 2:
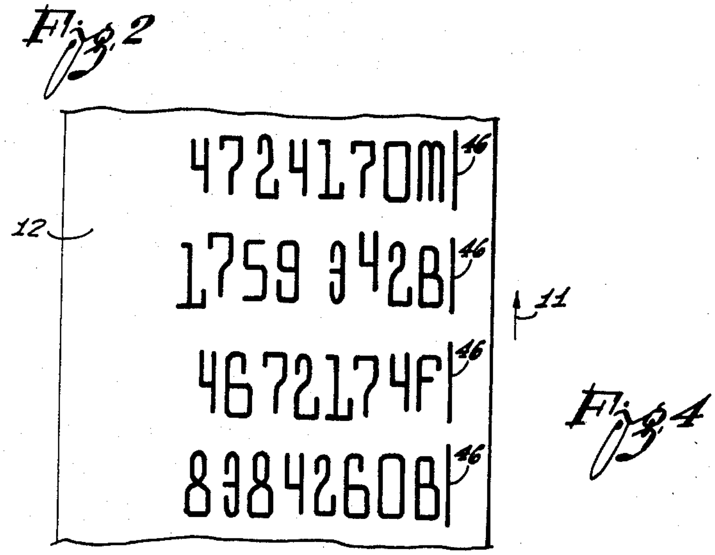
FIG. 2 illustrates a section of a typical paper tape having rows of stylized characters printed thereon.

Referring now to FIG. 2, a section of tape 12 is shown having rows of stylized characters printed thereon, the stylizing being in accordance with FIG. 1. The tape 12 is typical of printed characters which may be read by the character recognition system disclosed in the aforementioned copending patent application. It will be noted that a vertical line or reference mark 46 is located to the right of each row of characters and extends vertically above and below the highest and lowest portions of the characters in each row. While the provision of such a reference mark 46 is not essential, it does offer certain advantages which make its use desirable.

Briefly, the operation of the character recognition system disclosed in the aforementioned copending patent application is such that each row of characters is progressively scanned by successive sweeps across the row as the tape 12 is moved relatively slowly past a scanning station in the direction indicated by the arrow 11 in FIG. 2. A "read" scan is then performed on each character in the row, independently of the other characters in the row, only when each character has moved to a position so that scanning is along the proper paths $r_t$ and $r_b$ shown in FIG. 1, a record being made of the character information detected during a "read" scan of each character in the row. After all eight characters of a row have been read and recorded, scanning is then temporarily halted while the characters on the row are read out into suitable output equipment, the manner of character readout being determined in accordance with a particular one of the characters in each row, for example, the character nearest the reference mark 46.

Figure 3:
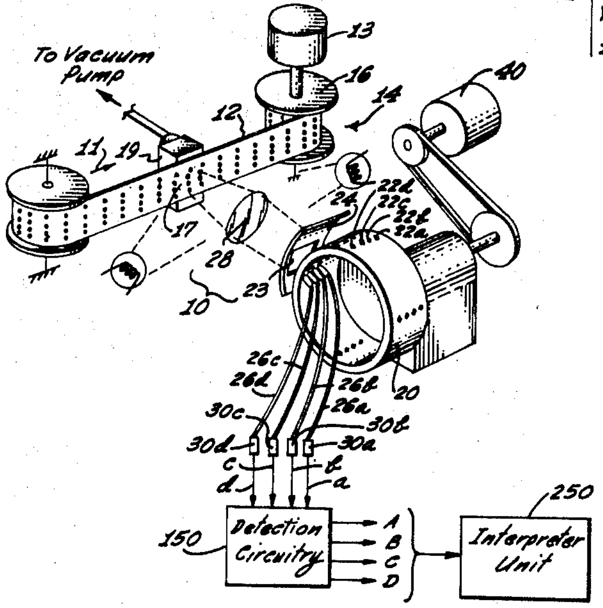
FIG. 3 is a schematic diagram of a type of character recognition system in which the detection means of the present invention may be advantageously employed.

Referring now to FIG. 3, a schematic representation is illustrated of an embodiment of an optical character recognition system in accordance with the aforementioned copending application showing, in particular, the optical scanning means incorporated therein. As shown in FIG. 3, a tape 12 such as illustrated in FIG. 2, is mounted for movement on a tape transport 14. A drive capstan 16 of the tape transport 14 is coupled to a synchronous motor 13 to move the tape 12 in the direction of the arrow 11 at a desired speed past the face of the forming head 19, which face defines the scanning station 17 for the tape 12.

By means of an optical lens 28, an image of the section of the tape 12 at the scanning station 17 is formed on the outer periphery of a rotating drum 20, which serves as a scanning means of an optical detector 10. The drum 20 is suitably coupled to a synchronous motor 40 to rotate the drum 20 at a desired speed. In order that the image formed on the rotating drum 20 will be in focus for the entire length of the row of characters extending across the width of the tape 12, the curved face of the forming head 19 is made to conform to the curvature of the drum periphery, and the section of the tape 12 at the scanning station 17 is maintained against the curved face of the forming head 19 by perforations leading to a vacuum chamber provided in the head 19.

The rotating drum 20 is provided with four identical groups of apertures equally spaced around the drum periphery, each group comprising four diamond-shaped apertures, such as illustrated in FIG. 3 by numerals **22*a*, 22*b*, 22*c*, and 22*d* for one such group. Interposed between the drum 20 and the lens 28 is a stationary shroud 24 surrounding a portion of the drum periphery and having a viewing slot or window 23 therein of sufficient size to permit a row of characters to be imaged on the drum periphery, the resulting image then being simultaneously scanned along four lateral paths by each group of four apertures as the group traverses the window 23**.

Four beam guides **26*a*, 26*b*, 26*c*, and 26*d* formed of Lucite rods, for example, are positioned adjacent the inner peripheral surface of the drum 20 opposite the window 23 in the shroud 24 so as to correspond to apertures 22*a*, 22*b*, 22*c*, and 22*d*, respectively. Changes in light level produced as each group of apertures 22*a*, 22*b*, 22*c*, and 22*d* scans the image on the rotating drum 20 are then transmitted through respective beam guides 26*a*, 26*b*, 26*c*, and 26*d* to photosensitive elements 30*a*, 30*b*, 30*c*, and 30*d*, respectively. These photosensitive elements 30*a*, 30*b*, 30*c*, and 30*d* are responsive to light variations appearing in their respective beam guides 26*a*, 26*b*, 26*c*, and 26*d*** to produce respective electrical signal outputs *a*, *b*, *c*, and *d* which are fed to detection circuitry 150, as shown in FIG. 3.

Detection circuitry 150, which may advantageously be constructed and arranged in accordance with the present invention, as will hereinafter be described is designed to operate on input signals *a*, *b*, *c*, and *d* in a manner so that respective output signals A, B, C, and D are produced, each of which consists of pulses of predetermined magnitude and duration which accurately represent the interception of character segments by its corresponding aperture 22*a*, 22*b*, 22*c*, or 22*d*. Since, as shown in FIG. 1, only the presence or absence of a character segment in each zone need be detected in order to obtain sufficient character information for identification of each character, the apertures 22*a*, 22*b*, 22*c*, and 22*d* may be made sufficiently large so that the detection circuitry 150 can more easily distinguish character segments from imperfections in the paper or from other extraneous marks. Preferably, the apertures 22*a*, 22*b*, 22*c*, and 22*d* are of diamond-shape, as shown in FIG. 3, with a transverse dimension equal to the average width of a vertical character segment. In such case, foreign matter or spurious marks on the paper will represent only a relatively small percentage of the total area viewed by an aperture while, on the other hand, a vertical character segment will represent the greater percentage of the total area viewed, thereby facilitating distinguishing of character segments from other extraneous marks.

As shown in FIG. 3, the signals A, B, C, and D thus derived at the output of the detection circuitry 150 are fed to an interpreter unit 250 which is constructed and arranged (as disclosed in considerable detail in the aforementioned copending patent application) to identify the characters in each row in response to the pulses provided by signals A, B, C, and D as each row is progressively scanned. In addition, the interpreter unit 250 includes means to store character identificaiton information for each character until all the characters in a row have been read, and then to output each row of characters to suitable output equipment (not shown) in a manner determined by a particular one of the characters in the row.

Figure 4:
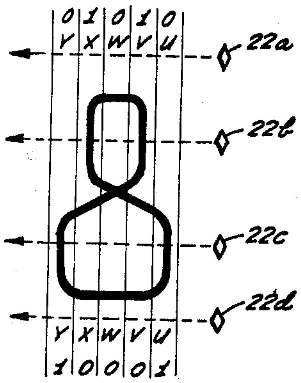
FIG. 4 illustrates the correct location of the scanning apertures of FIG. 3 for a "read" scan of a character.

Referring now to FIG. 4, it may be shown how correct vertical registration is assured in the character recognition system of the aforementioned copending patent application. The middle two apertures 22*b* and 22*c* illustrated in FIG. 4 serve as "read" apertures and are spaced in accordance with the spacing of the scanning paths $r_t$ and $r_b$ in FIG. 1. The correct vertical positioning of these "read" apertures 22*b* and 22*c* for a "read" scan of a character is conveniently determined by the interpreter unit 250 by noting when the suitably positioned fourth aperture 22*d* first fails to intercept any portion of the character during a scan thereof, which is the situation illustrated in FIG. 4 for the character "8." The interpreter unit 250 may then discard all other character identification pulses provided by signals B and C (which correspond to apertures 22*b* and 22*c*) and only make use of the character identification information obtained for each character when the character has moved to a position of correct vertical registration. Thus, vertical registration is conveniently achieved for each character independently of all other characters in the row.

Likewise, horizontal registration with respect to the location of the zones U, V, W, X, and Y is also achieved for each character independently of all other characters in the row. This is accomplished by stylizing each character in the system so that is has at least one vertical segment in a position corresponding to zone U, as shown in FIG. 1. The detection of this vertical segment in the zone U position of a character may then be used as a reference to accurately locate the remaining zones V, W, X, and Y for the character, regardless of the spacing between individual characters in the row.

As a further aid to correct horizontal registration, the detection circuitry 150 of FIG. 3 is preferably designed so that the pulses produced in signals A, B, C, and D representing vertical character segments are accurately positioned with respect to the center of each vertical segment. This permits accurate location of the zones of each character for a wide range of segment widths and ink weights, which is of considerable importance in improving the capability of the system to read poor quality printing. In addition, the first aperture 22*a* in FIG. 4 is provided as a further aid to correct horizontal registration, as well as aiding in providing accurate counting of each character in the row, since the provision of this additional aperture 22*a* assures that at least one of the four apertures will intercept the vertical segment provided in zone U for each character in the row even though the characters are appreciably misaligned vertically.

Figure 5:
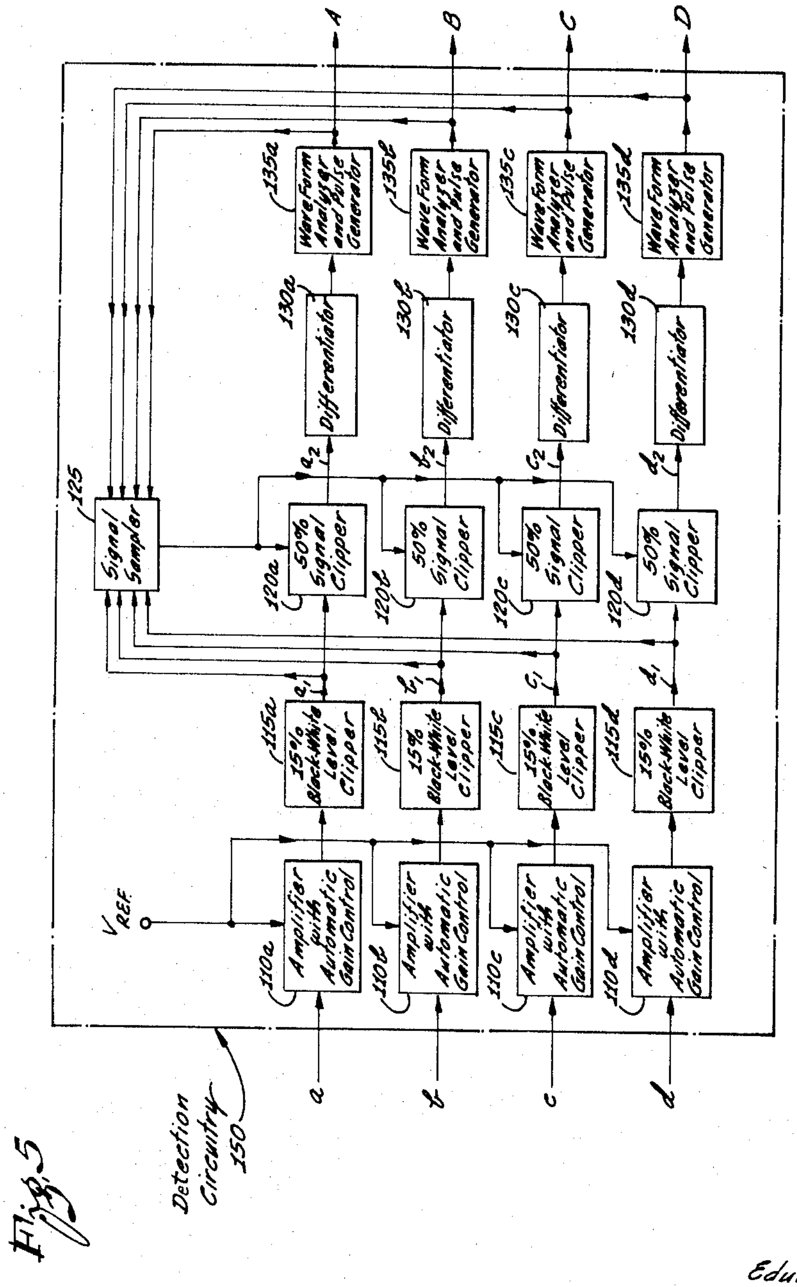
FIG. 5 is a block diagram illustrating a typical embodiment of detection circuitry in accordance with the present invention which may be incorporated in the character recognition system of FIG. 3.

Now that the embodiment of the character recognition system disclosed in the aforementioned copending patent application has been generally described with reference to FIGS. 1–4, the construction and arrangement of the detection circuitry 150, which may be incorporated therein in accordance with the present invention, will now be understood with reference to FIGS. 5 and 6. FIG. 5 is a block diagram of a preferred embodiment of the detection circuitry 150 of FIG. 3, and FIG. 6 illustrates typical signal waveforms appearing at various points in the block diagram of FIG. 5 as a row of characters is scanned.

Figure 6:
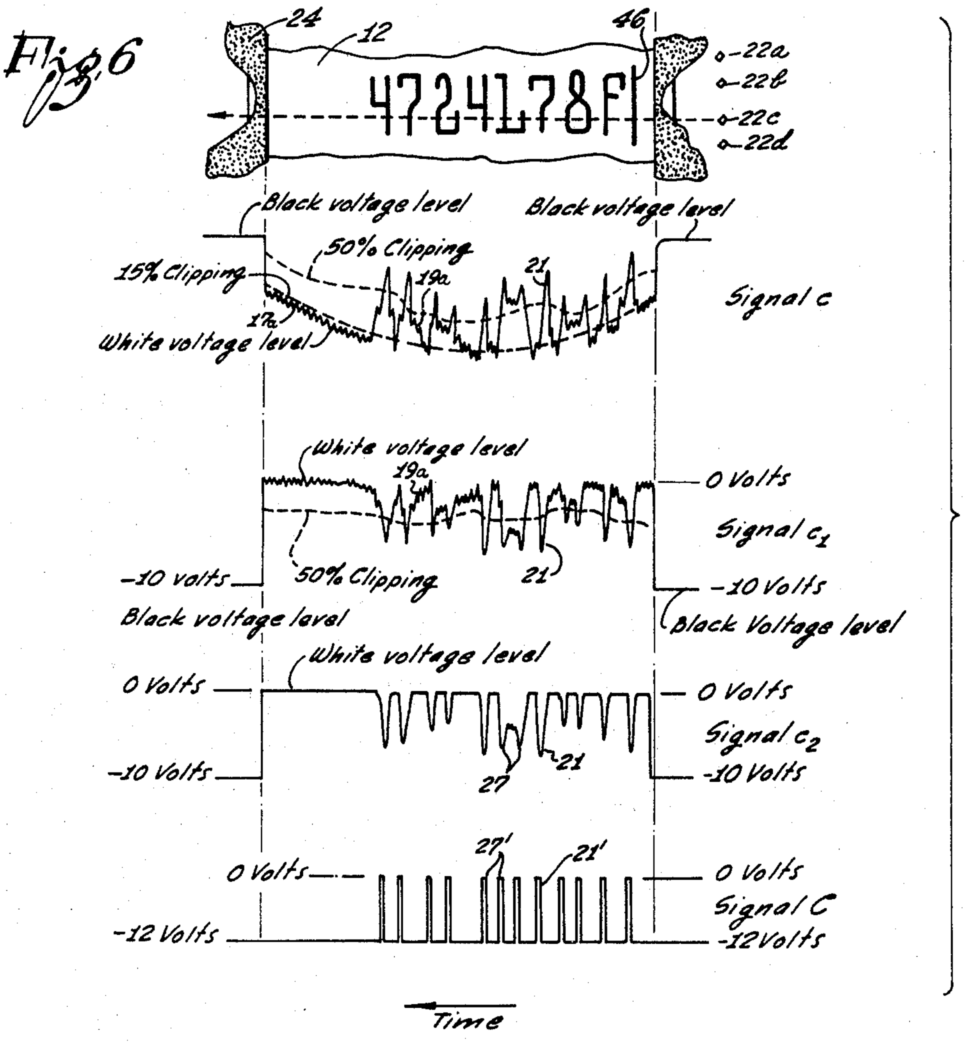
FIG. 6 illustrates typical waveforms appearing at various points in the block diagram of FIG. 5 as a row of characters is scanned.

Referring initially to FIG. 6, a section of the tape 12 is shown having a typical row of characters thereon which is optically projected on the periphery of the rotating drum 20 (FIG. 3). The shroud 24 is cut away in FIG. 6 to better illustrate a typical group of apertures 22*a*, 22*b*, 22*c*, and 22*d*, which are shown in a position such that they will shortly leave the shroud 24 and enter the area of the window 23 to begin another scan of a row of characters. For the purposes of the present discussion, only the signal produced as a result of a scan of the row in FIG. 6 by the aperture 22*c* will be considered at this time. A typical signal *c* obtained at the output of photomultiplier 30*c* in FIG. 3 as a result of such a scan is illustrated by the waveform in FIG. 6 designated as signal *c*. It will be understood that the signals provided by the other apertures will be of generally similar form, depending upon the character portions detected by each aperture in its scan across the row.

Referring to the signal *c* waveform in FIG. 6, it will be seen that a constant black voltage level is indicated which will be understood to correspond to the condition for which the aperture 22*c* receives substantially no illumination, such as occurs when the aperture is within the shroud 24. The average white voltage level indicated in the signal *c* waveform of FIG. 6, on the other hand, is seen to vary from a maximum at positions of aperture 22*c* near the shroud 24, to a minimum when aperture 22*c* is about half way across the window 23. Such a variation in the average value of the white level results from a greater illumination of the tape 12 near its center than near its ends, due to the fact that the shroud 24 tends to block off some of the illumination. In order to designate the range of signals in a manner so that both the black and white levels will be accounted for, the difference between the two signals will henceforth be referred to as the black-white signal level.

Still referring to the signal *c* waveform of FIG. 6, it will further be noted that there is a basic noise variation, such as illustrated at 17*a*, riding on the white signal level, which occurs because of foreign particles in the paper stock. Such noise will henceforth be referred to as paper noise. An additional type of noise is also present, such as illustrated at 19, which occurs primarily in the vicinity of each character. This noise results from ink splatter and its severity is approximately proportional to the heaviness of the print. Such noise due to ink splatter will henceforth be referred to as ink noise, and along with the paper noise, tends to obscure desired information signals, one such information signal being illustrated at 21. One of the tasks of the detection circuitry 150 shown in FIG. 5, therefore, is to prevent both of these noise signals from interfering with the detection of character segments. Briefly, this is accomplished by providing a first clipping level of 15%, for example, based on the black-white signal level occurring at each instant, as illustrated by the lower dashed line in signal *c* of FIG. 6, and then providing a second clipping level of 50%, for example, based on the maximum amplitude of the most recent information signal seen by any of the scanning apertures, as illustrated by the upper dashed line in signal *c* of FIG. 6. The manner in which both of these clippings are accomplished, as well as the specific manner in which information signals are detected will now be explained with reference to FIG. 5 and the other typical signal waveforms illustrated in FIG. 6.

Referring to FIG. 3 along with FIG. 5, it will be seen that each of the signals *a*, *b*, *c*, and *d* appearing at the outputs of photomultipliers 30*a*, 30*b*, 30*c*, and 30*d* is fed to an amplifier with automatic gain control respectively designated 110*a*, 110*b*, 110*c*, and 110*d* in FIG. 5. Each of these amplifiers is constructed and arranged to amplify and invert the signals *a*, *b*, *c*, and *d* applied thereto and to provide at the output thereof a signal whose average black-white signal level is approximately equal to a constant reference voltage $V_{REF}$, which is fed to each amplifier as a D.-C. reference, as shown. As a result, the black-white signal level of each of the signals *a*, *b*, *c*, and *d* is normalized to a constant reference voltage, which may typically be 4.5 volts, and the information signals in each of the signals *a*, *b*, *c*, and *d* will thereby have a common reference. Such normalization is valuable, since automatic compensation is thereby achieved for any variations which might occur in the black-white voltage level of any or all of the signals *a*, *b*, *c*, and *d*. For example, variations in the black-white voltage level could occur as a result of using paper stock having different reflection properties, or as a result of aging of the photomultipliers 30*a*, 30*b*, 30*c*, and 30*d*. It thus becomes possible to design the remainder of the detection circuitry 150 for signals having approximately the same black-white signal level, regardless of variations in the gain of the photomultipliers with respect to one another, or in the reflectivity of the paper stock employed. As will be appreciated by those skilled in the art, any of a number of well-known constructions and arrangements may be employed for the amplifiers 110*a*, 110*b*, 110*c*, and 110*d* in FIG. 5 which will be capable of producing the normalizing of signals *a*, *b*, *c*, and *d* as described above.

After being normalized to a reference black-white signal level, the signals *a*, *b*, *c*, and *d* appearing at the outputs of respective amplifiers 110*a*, 110*b*, 110*c*, and 110*d* are next fed to respective 15% black-white level clippers 115*a* 115*b*, 115*c*, and 115*d*. The operation of these 15% black-white level clippers is such that each of the signals *a*, *b*, *c*, and *d* respectively applied thereto is clipped by an amount equal to 15% of its instantaneous black-white signal level, as indicated by the lower dashed line in FIG. 6 for signal *c*. The resultant 15% clipped signal obtained at the output of each of these 15% black-white clippers 115*a*, 115*b*, 115*c*, and 115*d* is typically illustrated by the waveform designated as signal $c_1$ in FIG. 6, which waveform is inverted with respect to the signal *c* waveform. As will be noted in the signal $c_1$ waveform, paper noise variations have been essentially eliminated and, in addition, the white signal level has been brought to a constant level of zero volts, the black signal level being typically at −10 volts.

As shown in FIG. 5, each of the 15% clipped signals $a_1$, $b_1$, $c_1$, and $d_1$ appearing at the outputs of respective 15% black-white clippers 115*a*, 115*b*, 115*c*, and 115*d* is next fed to respective 50% signal clippers 120*a*, 120*b*, 120*c*, and 120*d* as well as to a signal sampler 125. Also fed to the signal sampler 125 are output signals A, B, C, and D, which are used by signal sampler 125 in conjunction with signals $a_1$, $b_1$, $c_1$, and $d_1$ to provide, for each of the 50% signal clippers 120*a*, 120*b*, 120*c*, and 120*d*, a reference clipping level at each instant equal to approximately 50% of the maximum amplitude of the most recent information signal previously appearing in any of the signals $a_1$, $b_1$, $c_1$, or $d_1$. As a result, the signals $a_1$, $b_1$, $c_1$, and $d_1$ are again clipped, as illustrated by the upper dashed line in signal *c* and the single dashed line in signal $c_1$ of FIG. 6, to provide resultant signals $a_2$, $b_2$, $c_2$, and $d_2$ at the outputs of the respective 50% signal clippers 120*a*, 120*b*, 120*c*, and 120*d*, typically illustrated by the signal $c_2$ waveform in FIG. 6. It will be noted, that this second clipping has thus effectively eliminated the ink noise indicated at 19*a* in the signal *c* and $c_1$ waveforms of FIG. 6. Thus, information signals in the $c_2$ signal waveform, as illustrated at 21, are now more easily distinguishable, since both the paper and ink noise have now been substantially eliminated by the 15% and 50% clipping operations just described.

Before leaving the 50% signal clippers 120*a*, 120*b*, 120*c*, and 120*d*, it will be helpful to point out at this time that the use of a clipping level equal to 50% of the maximum amplitude of the most recent previous information signal in any of the four signals $a_1$, $b_1$, $c_1$, and $d_1$ is very much to be preferred over providing a separate clipping level for each of the signals $a_1$, $b_1$, $c_1$, and $d_1$. This is because, one or more of the apertures, such as the apertures 22*a* and 22*d* in FIG. 6, may be in a position so that it will not intercept any characters during the scan of a row. In such a case, there would be no way to establish the clipping level for the signal obtained from such apertures and, if ink splatter or an ink spot were in its path, it might incorrectly appear as an information signal. However, by using a clipping level equal to 50% of the maximum amplitude of the most recent information signal seen by any of the four apertures, as described above, the clipping level is carried over to all of the signals $a_1$, $b_1$, $c_1$, and $d_1$ to overcome ink noise, even though one or more of the apertures has no character portions in its path during the scan of a row.

Having thus eliminated the paper and ink noise from the signal waveforms, as illustrated by the signal $c_2$ waveform in FIG. 6, it then becomes necessary to convert the signal information in each of the signals $a_2$, $b_2$, $c_2$, and $d_2$ into pulses representing the vertical segments intercepted by each of the respective apertures 22*a*, 22*b*, 22*c*, and 22*d* during the scan of a row. This is accomplished in the detection circuitry 150 of FIG. 5 by feeding the signals $a_2$, $b_2$, $c_2$, and $d_2$ to respective differentiators 130*a*, 130*b*, 130*c*, and 130*d*, the output of which are in turn fed to respective waveform analyzer and pulse generators 135*a*, 135*b*, 135*c*, and 135*d* for producing the desired output signals A, B, C, and D, respectively, as illustrated for the signal C in FIG. 6.

As will be described in further detail in connection with FIGS. 8–10, each of the differentiators 130*a*, 130*b*, 130*c*, and 130*d* operates in cooperation with its respective waveform analyzer and generator 135*a*, 135*b*, 135*c*, or 135*d* so that pulses are produced in the respective output signals A, B, C, and D only in response to those signals in the clipped waveforms $a_2$, $b_2$, $c_2$, and $d_2$ which are substantially of the form which would be obtained as a result of the interception of a vertical character segment by a scanning aperture. In this way, noise signals or other extraneous signals will not cause a false output pulse in signal C, even though such signals are above the 50% clipping level.

While noise and extraneous signals are thus prevented from producing false output signals, true character information signals produce output pulses in the signal C waveform. For example, the character information signal illustrated at 21 in the signal *c*, $c_1$, and $c_2$ waveforms, which signal 21 is obtained as a result of aperture 22*c* intercepting the lower vertical segment of the character "7" on the tape 12, properly produces the output pulse indicated at 21' in the signal C waveform. In a like manner, all of the other pulses illustrated in the signal C waveform of FIG. 6 are similarly produced from character information signals obtained as a result of the interception of aperture 22c with the vertical segments of other characters on the row. It will be noted in FIG. 6 that even character information signals which are not well separated, such as indicated at 27 in the signal $c_2$ waveform, are still able to form discrete pulses in the output signal C as indicated at 27'. As will be explained hereinafter, this high resolution is achieved as a result of the differentiation of the signal $c_2$ waveform prior to forming the output pulses in signal C.

From the above description of the detection circuitry of FIG. 5 and the illustrative waveforms of FIG. 6, it should now be evident that the detection circuitry 150 exhibits a remarkable degree of intelligence in that it is able to recognize character information signals representing vertical character segments, and to produce discrete output pulses therefrom, even though the character information signals are not well separated, while at the same time preventing noise and other extraneous signals from producing false outputs. And, further, it is to be noted that accurate detection is achieved despite varying levels of paper or ink noise.

In order to permit the detection circuitry 150 of FIG. 5 to be better understood, preferred embodiments of the 15% black-white level clipper 115c, the 50% signal clipper 120c, the signal sampler 125 and the waveform analyzer and pulse generator 135c will be described in connection with FIGS. 7–12. While these preferred embodiments will primarily be concerned with the signal *c*, it will be understood that similar embodiments may also be provided for signals *a*, *b*, and *d*. It is to be noted that no detailed embodiments will be provided for either amplifiers 110a, 110b, 110c, or 110d, or for the differentiators 130a, 130b, 130c, or 130d, since these may readily be provided by one skilled in the art to operate as required in the present invention.

Figure 7:
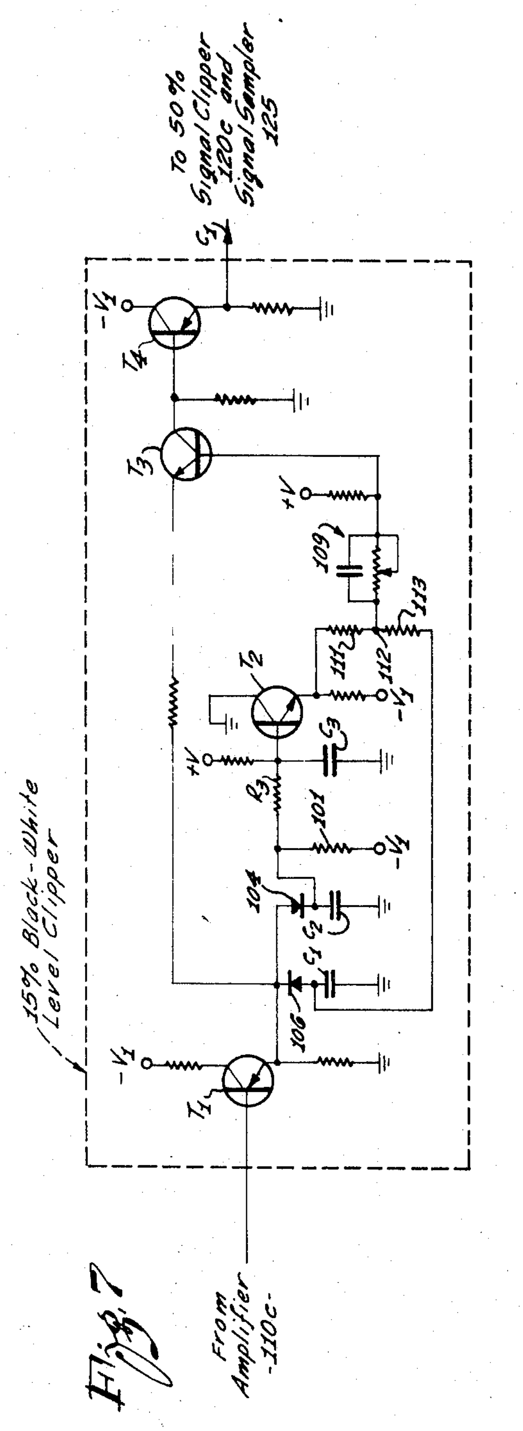
FIG. 7 is a circuit diagram of a preferred embodiment of a typical one of the 15% black-white level clippers of FIG. 5.

Referring first to FIG. 7, a circuit diagram is shown of a preferred embodiment of the 15% black-white level clipper 115c of FIG. 5. The amplified signal from the amplifier 110c, which is fed to the 15% black-white level clipper 115c, is similar to the signal *c* waveform shown in FIG. 6, except that it is inverted and its average black-white signal level has been brought to an average reference level which may typically be 4.5 volts. This signal from amplifier 110c is first applied to the base of a P-N-P transistor $T_1$ connected as an emitter follower in order to provide a low output impedance for charging capacitor $C_1$, through a negatively poled diode 106, to the black level voltage of the input signal. The value of capacitor $C_1$ is chosen sufficiently large so that it remains charged up to the black level voltage during system operation.

In a like manner, the capacitor $C_2$ in FIG. 7 is charged through a positively poled diode 104 to the instantaneous white voltage level occurring at each instant during the scan of a row. To accomplish this, the capacitor $C_2$ is chosen in accordance with the negative D.-C. voltage source $-V_1$ and the resistor 101 therebetween so that the time constant of the charging circuit is sufficiently small to permit the capacitor $C_2$ to substantially follow the instantaneous white voltage level of the inverted signal *c* waveform appearing at the emitter of transistor $T_1$.

Figure 8:
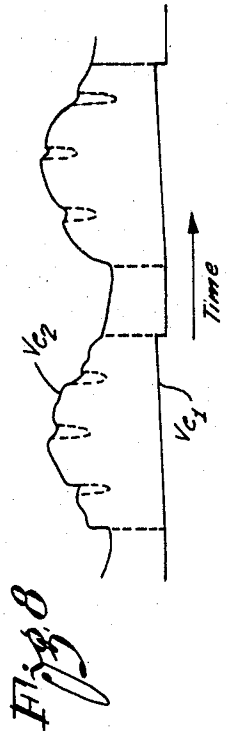
FIGS. 8 and 9 illustrate typical signals appearing at various points in the circuit diagram of FIG. 7.

The voltages $Vc_1$ and $Vc_2$ thus provided across respective capacitors $C_1$ and $C_2$, which voltages $Vc_1$ and $Vc_2$ respectively correspond to the black level voltage and the instantaneous white level voltage of the inverted signal *c* waveform at the emitter of transistor $T_1$ in FIG. 7, are illustrated in FIG. 8 for two typical scans of a row by the aperture 22c. For purposes of greater clarity, the inverted signal *c* waveform is shown dashed in FIG. 8 and only three character information signals are illustrated during each scan in order to prevent confusion.

Figure 9:
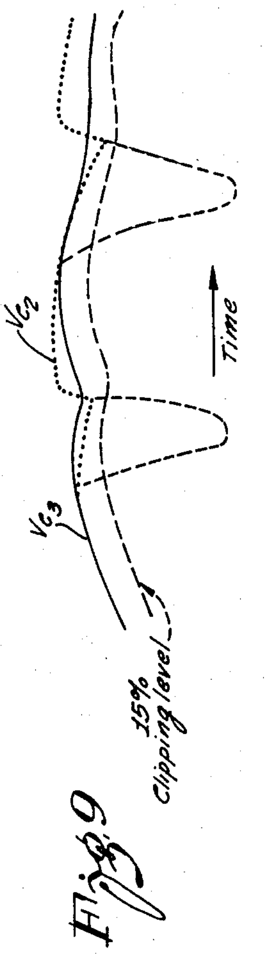

The instantaneous white level voltage $Vc_2$ across capacitor $C_2$ in FIG. 7 is next fed to an integrating circuit formed by a resistor $R_3$ and a capacitor $C_3$ in order to smooth out the white level voltage, as illustrated in FIG. 9 by the $Vc_3$ waveform, which represents the voltage across the capacitor $C_3$. FIG. 9 is an enlarged portion of the waveform of FIG. 8, the signal *c* being shown by a curve formed of short dashed lines, as in FIG. 8, while the voltage $Vc_2$ waveform representing the voltage across capacitor $C_2$ is shown dotted.

The resulting white level voltage $Vc_3$ appearing across capacitor $C_3$ is next fed to the base of an N-P-N transistor $T_2$ connected as an emitter follower in order to prevent modifying the voltage on capacitor $C_3$. The output white level voltage thereby obtained at the emitter of transistor $T_2$ is then fed to one end of a voltage divider formed by the series resistors 111 and 113, the other end of the voltage divider being connected to capacitor $C_1$ (which stores the black level voltage). The resistors 111 and 113 are chosen so that the voltage appearing at the junction 112 therebetween provides a clipping voltage equal to 15% of the instantaneous black-white signal level of the inverted signal *c* waveform appearing at the emitter of transistor $T_1$. This clipping voltage is then fed through a voltage level compensation network 109 to serve as a bias to the base of a silicon transistor $T_3$, while the inverted signal *c* waveform is applied to the emitter thereof from the emitter of transistor $T_1$. As a result, the inverted signal *c* is clipped by an amount equal to 15% of its instantaneous black-white signal and is then provided with a low output impedance upon being passed through an emitter follower transistor $T_4$ to produce the 15% clipped signal $c_1$ waveform illustrated in FIG. 6.

Figure 10:
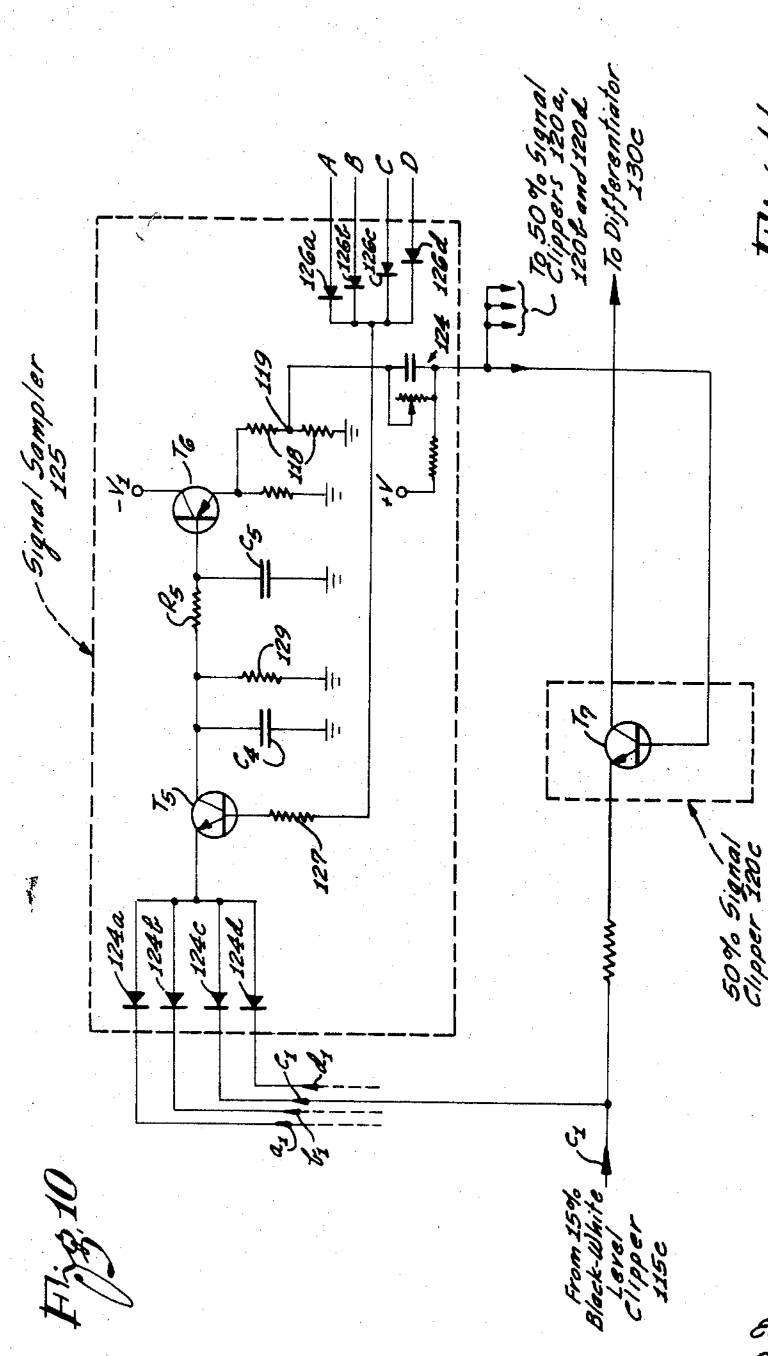
FIG. 10 is a circuit diagram of a preferred embodiment of the signal sampler and a typical one of the 50% signal clippers of FIG. 5.
Figure 11:
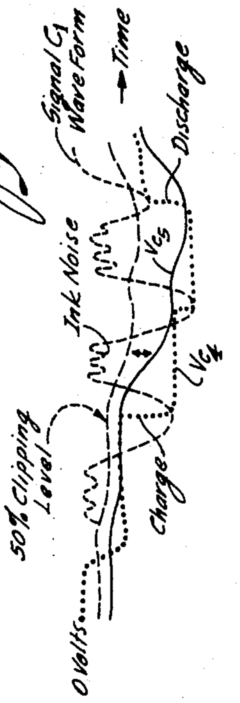
FIG. 11 illustrates typical signals appearing at various points in the circuit diagram of FIG. 10.

Now that a preferred embodiment of the 15% black-white clipper 115c of FIG. 5 has been described, preferred embodiments of the 50% signal clippper and the signal sampler 125 will next be considered with reference to FIGS. 10 and 11. Referring to FIG. 10 along with FIG. 5, it will be seen that, besides feeding the signal $c_1$ from the 15% black-white level clipper 115c to the 50% signal clipper 120c, signal $c_1$ is also fed to signal sampler 125, along with signals $a_1$, $b_1$, and $d_1$ from the other three 15% black-white level clippers 115a, 115b, and 115c, respectively. Negatively poled diodes 124a, 124b, 124c, and 124d are interposed in respective paths of signals $a_1$, $b_1$, $c_1$, and $d_1$ so as to form, in effect, a logical "or" gate which permits the largest amplitude (most negative) signal appearing in any of the signals $a_1$, $b_1$, $c_1$, or $d_1$ at any instant to be applied to the emitter of an N-P-N transistor $T_5$ of signal sampler 125.

In order to control the time duration for which transistor $T_5$ is permitted to operate, signals A, B, C, and D are applied to the base of transistor $T_5$ through a resistor 127 and through respective positively poled diodes 126a, 126b, 126c, and 126d as shown in FIG. 10 which diodes also form a logical "or" gate. It will be seen from the typical signal C waveform of FIG. 6 (which is also typical of signals A, B, and D), that signal C ordinarily rests at −12 volts and is brought to zero volts by each 12-volt character information pulse. Thus, if no pulse appears in any of the signals A, B, C, or D, the base of transistor $T_5$ will rest at −12 volts and transistor $T_5$ will be cut-off. However, when a pulse does appear in any of the signals A, B, C, or D, the base of transistor $T_5$ will jump to zero volts for the duration of the pulse, in which case two situations are possible: (1) if capacitor $C_4$ connected between the collector of transistor $T_5$ and circuit ground is charged to a negative voltage which is less negative than the largest amplitude (most negative) signal appearing in signals $a_1$, $b_1$, $c_1$, or $d_1$ (see for example the typical signal $c_1$ waveform in FIG. 6), then transistor $T_5$ will be saturated and permit capacitor $C_4$ to be charged, as a result of current flow between the emitter and collector of transistor $T_5$, to the largest amplitude (most negative) signal appearing at that instant in any of signals $a_1$, $b_1$, $c_1$, or $d_1$; (2) if, however, capacitor $C_4$ is charged to a voltage more negative than the largest amplitude (most negative) signal appearing in any of the signals $a_1$, $b_1$, $c_1$, or $d_1$, during the period, then capacitor $C_4$ will rapidly discharge (that is, become less negative) as a result of current flow through the diode formed by the collector and base of transistor $T_5$ and the relatively low value resistor 127, until the voltage on capacitor $C_4$ becomes equal to the maximum amplitude (most negative) signal appearing in any of the signals $a_1$, $b_1$, $c_1$, or $d_1$. The time constants of the charging and discharging circuits of capacitor $C_4$ are chosen so that capacitor $C_4$ will become equal to the maximum amplitude (most negative) signal appearing in signals $a_1$, $b_1$, $c_1$, or $d_1$ within the pulse period of a pulse of any of the signals A, B, C, or D during which the base of transistor $T_5$ is driven to zero volts. Resistor 129 connected across capacitor $C_4$ is of relatively high resistance and serves as a discharge resistor.

It will thus be understood from the previous paragraph, that each time a pulse is produced in any of the output signals A, B, C, or D, the voltage on capacitor $C_4$ is driven to a value equal to the maximum amplitude (most negative) signal in any of the signals $a_1$, $b_1$, $c_1$, or $d_1$, regardless of whether the initial voltage on capacitor $C_4$ is above or below this value; and, during the time between pulses from A, B, C, or D, capacitor $C_4$ very slowly discharges through discharge resistor 129 connected in parallel therewith.

The voltage on capacitor $C_4$ is then smoothed by means of an integrating circuit formed by resistor $R_5$ and capacitor $C_5$, the resultant integrated voltage $Vc_5$ across capacitor $C_5$ as well as the voltage $Vc_4$ across capacitor $C_4$ being illustrated by the enlarged signal waveform portion shown in FIG. 11 of a typical signal $c_1$ waveform. The dotted line curve in FIG. 11 represents voltage $Vc_4$, the solid line curve represents voltage $Vc_5$, and the curve formed of short dashes in FIG. 11 represents the signal $c_1$ waveform.

For convenience of illustration, it is assumed in FIG. 11 that the information signals in the signal $c_1$ waveform are the ones which are of maximum amplitude as compared to the information signals appearing in signals $a_1$, $b_1$, and $d_1$. For such an assumption, the information signals in signal $c_1$ will then be the ones which will be applied to the emitter of transistor $T_5$. This is indicated in FIG. 11 by the voltage $Vc_4$ charging to the maximum value of each information signal in the signal $c_1$ waveform. It will also be noted in FIG. 11 that voltage $Vc_4$ is shown as being charged and discharged at approximately the instant when each information signal in the signal $c_1$ waveform reaches its maximum (most negative) amplitude. This occurs because, as will hereinafter be described in connection with the preferred embodiment of the waveform analyzer and pulse generator 135c of FIG. 5, each of the pulses produced in signals A, B, C, and D is caused to begin at the instant that an information signal reaches its maximum (most negative) amplitude.

The desired 50% clipping voltage is now obtained by feeding the integrated voltage $Vc_5$ appearing across capacitor $C_5$ to an N-P-N transistor $T_6$ connected as an emitter follower so as to prevent modification of the capacitor voltage $Vc_5$, the resultant output signal at the emitter of transistor $T_6$ is then reduced by 50% by the action of a voltage divider formed by equal resistors 118 to provide, at the junction 119, the desired 50% clipping voltage based on the maximum amplitude of the most recent information signal, as typically illustrated by the curve formed of long dashed lines in FIG. 11. This 50% clipping voltage obtained at junction 119 of signal sampler 125 is next fed through a voltage level shift network 124 to each of the 50% signal clippers 120a, 120b, 120c, and 120d, as generally shown in FIG. 5, a preferred form of the 50% signal clipper 120c being shown in FIG. 10.

It will be seen from FIG. 10 that the 50% clipping voltage at junction 119 of signal sampler 125 is applied as a clipping bias to the base of an N-P-N transistor $T_7$ in 50% signal clipper 120c, the emitter of transistor $T_7$ receiving the signal $c_1$ from the 15% black-white level clipper 115c. Transistor $T_7$ thus acts to clip signal $c_1$, in accordance with the 50% clipping bias applied to its base to produce, at its collector, the resultant signal $c_2$ as typically illustrated in FIG. 6. It will be noted from signal $c_2$ in FIG. 6 that both paper noise and ink noise have been substantially eliminated as a result of the 15% and 50% clipping provided as described herein.

Figure 12:
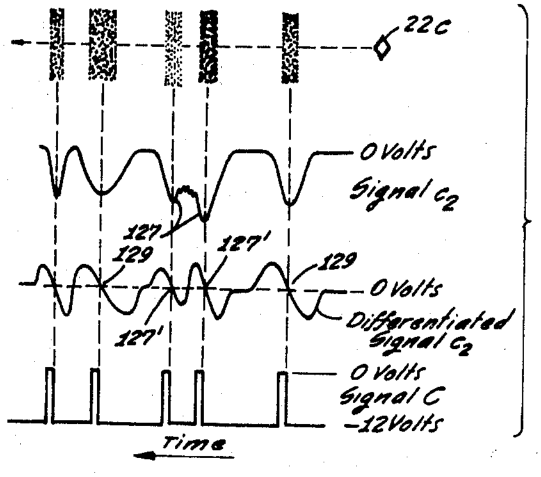
FIG. 12 is a series of graphs illustrating the operation of a typical differentiator of FIG. 5 and its respective waveform analyzer and pulse generator.

As shown in FIG. 5, the resulting signals $a_2$, $b_2$, $c_2$, $d_2$ obtained at the output of respective 50% signal clippers 120a, 120b, 120c, and 120d are next applied to respective differentiators 130a, 130b, 130c, and 130d, each of which performs, in a conventional manner, an electronic differentiation on its respective signal $a_2$, $b_2$, $c_2$, or $d_2$. The action of each differentiator will be better understood by reference to FIG. 12, which illustrates typical differentiated signals obtained as a result of the differentiation of the signal $c_2$ waveform by differentiator 130c. FIG. 12 also illustrates the output pulses produced in signal C by wave analyzer and signal generator 135c in response to the differentiated signal $c_2$ waveform.

Referring to FIG. 12, it will be seen that, as a result of differentiation, distinct positive-going zero crossovers are obtained in the differentiated signal $c_2$ waveform, such as illustrated at 129, for a wide range of vertical segment width and ink weights. In fact, even though character information signals in the signal $c_2$ waveform are not easily distinguishable, such as indicated at 127 in FIG. 12, they still produce easily distinguishable discrete positive-going zero crossovers in the differentiated signal $c_2$ as indicated at 127'. Output pulses which accurately represent character segments may then be readily provided by the waveform analyzer and pulse generator 135c in response to these positive-going zero crossovers of the differentiated signal $c_2$ waveform, as shown in the signal C waveform of FIG. 12.

In addition, to prevent false output pulses from appearing in the signal C waveform as a result of noise or other extraneous signals, the waveform analyzer and pulse generator 135c is constructed and arranged to provide an output pulse in signal C in response to each positive-going zero crossover only if the differentiated signal in the vicinity of the positive-going zero crossover is of a form which would be expected to be obtained for a correct information signal. A preferred embodiment of a waveform analyzer and pulse generator 135c capable of achieving such performance is illustrated in block form in FIG. 13.

Figure 13:
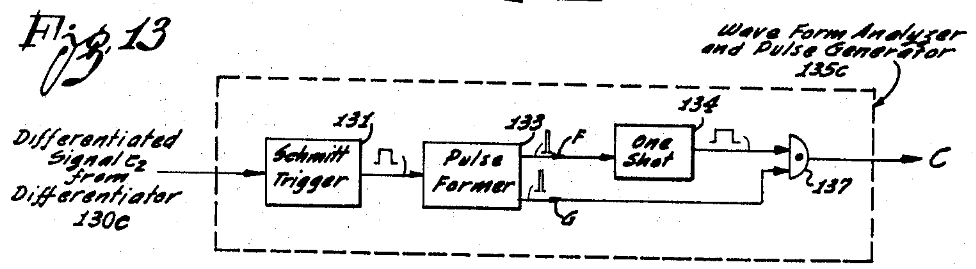
FIG. 13 is a block diagram of a preferred embodiment of a typical waveform analyzer and pulse generator of FIG. 5.
Figure 14:
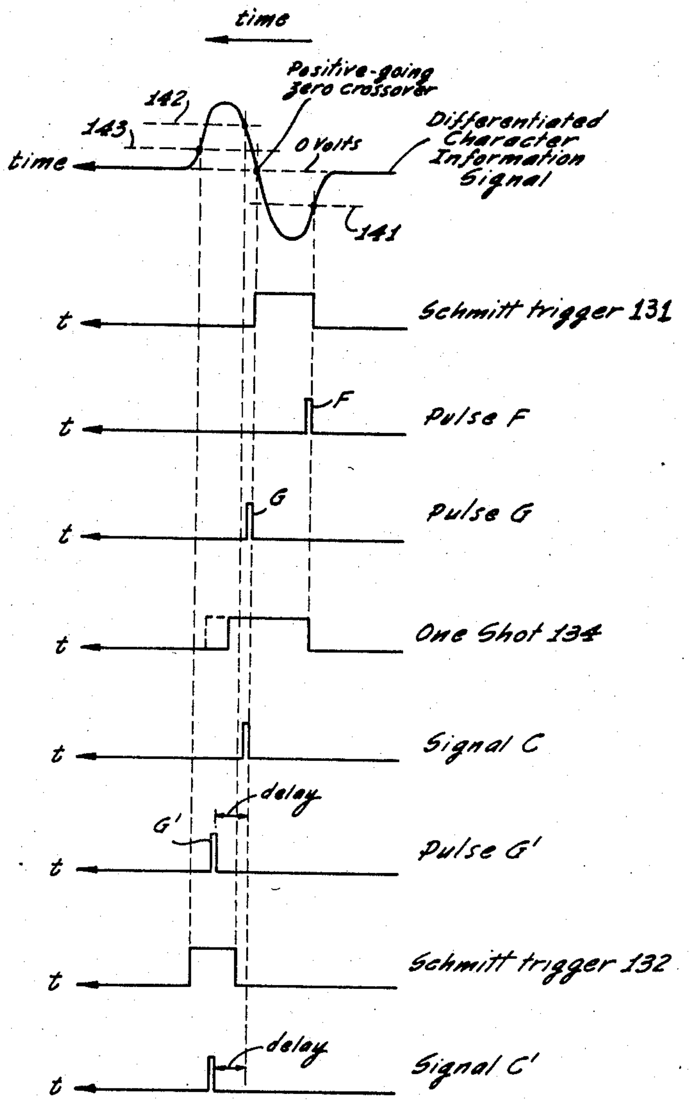
FIG. 14 is a series of graphs illustrating the signals appearing at various points in the block diagram of FIG. 13.

Referring to the waveform analyzer and pulse generator 135c shown in FIG. 13, it will be seen that the differentiated signal $c_2$ from differentiator 130c is fed to conventional Schmitt trigger 131 to control the triggering thereof, a typical differentiated character information signal in the signal $c_2$ waveform being illustrated by the top waveform in FIG. 14. Schmitt trigger 131 is designed to be triggered "on" when the differentiated character information signal reaches a predetermined negative voltage level indicated at 141 in FIG. 14, and to be triggered "off" again when the differentiated information signal returns to zero volts, as shown by the corresponding Schmitt trigger 131 waveform in FIG. 14.

The output of Schmitt trigger 131 is next fed to a pulse former 133 which produces the pulses F and G in response to the leading and trailing edges, respectively, of the output signal of Schmitt trigger 131, as shown in the corresponding F and G wavefroms in FIG. 14. The pulse F is then fed to a one-shot 134 which produces an output pulse of predetermined duration, as shown by the solid line in the one-shot 134 waveform of FIG. 16, the duration of the output signal of one-shot 134 being chosen to be sufficiently long so as to be present for a time approximately equal to the maximum time that a positive-going zero crossover would be expected if the differentiated waveform is a proper character information signal.

The other pulse G produced by pulse generator 133 is fed to an "and" gate 137 along with the output signal of one-shot 134. The "and" gate 137, which may be of conventional form, is constructed and arranged to pass pulse G therethrough to produce an output pulse in signal C only if the output signal from one-shot 134 is present at the input of "and" gate 137 simultaneously with pulse G, which is the situation illustrated in FIG. 14. Thus, even though noise and other extraneous signals are of sufficient amplitude to turn Schmitt trigger "on" and "off" and thereby cause a pulse G to be formed representing a positive-going zero crossover, an output pulse will still not be produced in signal C unless the pulse G occurs when the one-shot 134 output signal is present.

Figure 15:
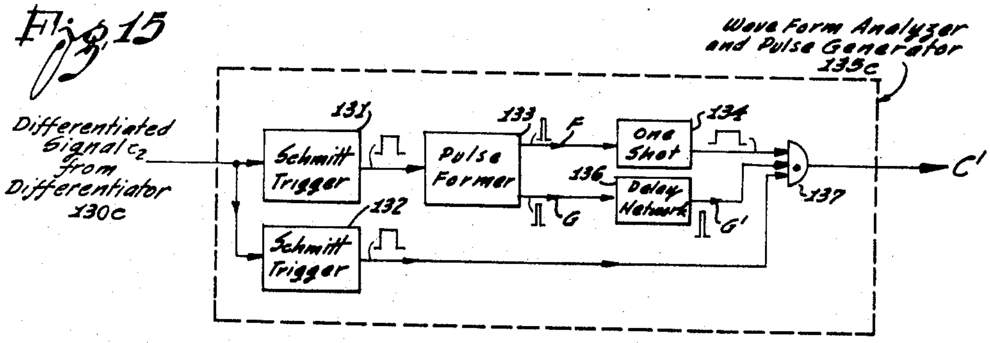
FIG. 15 is a schematic diagram illustrating a modification of the wave analyzer and pulse generator of FIG. 13.

If further discrimination against noise and other extraneous signals is desired than is obtainable by means of the waveform analyzer and signal generator 135c of FIG. 13, the modification illustrated in FIG. 15 may be employed. In this modification, the circuit shown in FIG. 13 remains the same, except that: a second Schmitt trigger 132 is provided to which the differentiated signal $c_2$ waveform is also fed; a delay network 136 is provided to delay pulse G by a predetermined amount before being fed to "and" gate 137, as indicated by the G′ waveform of FIG. 14 which illustrates the delayed pulse G′; the duration of the output of the one-shot 134 is increased, as indicated by the dashed line of the one-shot 134 waveform in FIG. 14; and the output signal of the second Schmitt trigger 132 is fed to "and" gate 137 along with the delayed pulse G′ and the output signal from one-shot 134.

The second Schmitt trigger 132 is provided in the modification of FIG. 15 to permit the characteristics of the differentiated character information signal waveform occurring after the positive-going zero crossover to also be taken into account in determining whether an output pulse is to be produced, instead of just the waveform occurring before the positive-going crossover, as in the circuit of FIG. 13. Specifically, the second Schmitt trigger 132 is designed to be triggered "on" when the differentiated character information signal reaches a first positive predetermined voltage level indicated at 142 in FIG. 14, and to be triggered "off" again when the differentiated character information signal next returns to a second less positive predetermined voltage level 143, as illustrated by the Schmitt trigger 132 waveform in FIG. 14.

Thus, as a result of the FIG. 15 modification, "and" gate 137 is able to pass delayed pulse G′ to produce an output pulse in the signal C′ waveform of FIG. 14 only if the signal outputs of both the "one-shot" 134 and the second Schmitt trigger 132 are simultaneously present along with delayed pulse G′. It becomes possible, therefore, to choose the delay provided by delay network 136 in conjunction with the duration of the one-shot 134 to provide further discrimination against noise and other extraneous signals, over and above the discrimination provided by the circuit of FIG. 13. For example, even though a differentiated signal reaches the first negative voltage level indicated at 141 in FIG. 14 and passes through a positive-going zero crossover during the time that the output signal of one-shot 134 is present, "and" gate 137 in FIG. 15 will still not pass delayed pulse G′ unless the output signal from the second Schmitt trigger 132 is present as a result of having been triggered "on" by the differentiated signal reaching the first predetermined positive voltage level indicated at 142 in FIG. 14. Of course, the output pulses obtained in signal C′ by means of the FIG. 15 modification will now be delayed with respect to the output pulses in the original signal C waveform obtained in the FIG. 13 circuit, but this will cause no problem in character identification, since the delay is constant for all pulses and their relative positioning will thus remain the same. Also, it wlil be appreciated that in the modification of FIG. 15, the undelayed pulse G should be fed to signal sampler 125 instead of the delayed output pulse in signal C′ in order that signal sampler 125 be operated at the proper time.

An interesting feature of the extraction of character information signals from the twice-clipped signal $c_2$ waveform by means of the differentiator 130c and the waveform analyzer and pulse generator 135c shown in FIGS. 5,13, and 15 is that, because each output pulse is initiated in response to the positive-going zero crossover of its differentiated waveform, each output pulse will be accurately located with respect to the center line of the intercepted vertical character segment to which it corresponds for a wide range of segment widths. For example, the FIG. 13 embodiment of the waveform analyzer and pulse generator 135c will produce output pulses in signal C which are each initiated substantially at the center line of its corresponding vertical character segment, while in the FIG. 15 modification, the output pulses in signal C′ will each be delayed with respect to its corresponding vertical character segment by an amount determined by delay network 136 in FIG. 15.

Thus, in both the embodiments of FIGS. 13 and 15, each output pulse is accurately located with respect to the center line of its corresponding vertical character segment, which is most advantageous from the viewpoint of obtaining accurate horizontal registration, as pointed out in the aforementioned copending patent application. This advantageous relationship with respect to an output pulse and the center line of its corresponding vertical character segment is achieved for a wide range of segment widths because of two factors. First, the use of diamond-shaped apertures 22a, 22b, 22c, and 22d on the rotating drum 20 in FIG. 3 assures that for vertical segments smaller than the width of the apertures, minimum light is reflected to an aperture substantially at the point when the aperture is centrally located with respect to the vertical segment. Thus, each resulting character information signal for such vertical character segments will be maximum at a point corresponding to the center line of the intercepted vertical character segment. The positive-going zero crossover of the differentiated character information signal, which occurs at the maximum point, will then necessarily also correspond to the center line. Secondly, for vertical character segments having widths greater than the diamond-shaped apertures so that a diamond aperture by itself will not produce a distinct zero crossover at the center line, the fact that the print inherently grows lighter by equal amounts on both sides of its center line will still assure that the positive-going zero crossover of the differentiated character information signal occurs substantially at the center line of the segment.

It is to be understood that the embodiments described herein are only exemplary and that various modifications may be made in the construction, arrangement, operation, and use thereof in accordance with the present invention. The invention, therefore, is to be considered as including all such modifications and variations coming within the scope of the invention as defined in the appended claims.

What is claimed is:

1. Detection means comprising means for deriving an electrical signal having spaced intelligence information included therein, means for automatically providing a clipping level for each information signal by clipping said electrical signal by an amount based on a predetermined percentage of the amplitude of the most recently occurring intelligence information appearing in said signal, and means for extracting said intelligence information from the clipped signal.

2. Detection means comprising means for deriving an electrical signal having intelligence information included therein as spaced information signals, signal clipping means for automatically providing a clipping level for said information signals by clipping said electrical signal by an amount based on a predetermined percentage of the maximum amplitude of the most recently ocurring information signal appearing in said electrical signal, means for extracting said information signals from the clipped electrical signal, and means cooperating with said signal clipping means for utilizing the extracted information signals to determine the amplitude of the most recently occurring information signal in said electrical signal.

3. Detection means comprising means for deriving an electrical signal having intelligence information included therein as information signals, signal sampling means for sampling the maximum amplitude of each information signal and for producing a clipping level equal to a predetermined percentage of the maximum amplitude of the most recently occurring information signal, clipping means to which said clipping level is fed for automatically clipping said electrical signal in accordance therewith, means for extracting said information signals from the clipped electrical signal and for producing discrete output pulses in response thereto, each output pulse being initiated at substantially the maximum point of each information signal, and means feeding said output pulses to said signal sampling means, said signal sampling means being constructed and arranged to sample said electrical signal applied thereto at periods determined by said output pulses.

4. Detection means comprising means for deriving an electrical signal having spaced intelligence information included therein as information signals, first clipping means for automatically performing a first clipping of said electrical signal by an amount based on a predetermined percentage of the instantaneous peak-to-peak amplitude levels of said electrical signal excluding the amplitude of said information signals, second clipping means for automatically performing a second clipping of the electrical signal obtained after said first clipping by an amount based on a predetermined percentage of the maximum amplitude of the most recently occurring information signal appearing in said electrical signal, and means for extracting said information signals from the twice-clipped electrical signal and for producing discrete output pulses in response thereto.

5. Detection means for detecting information signals contained in a plurality of simultaneously occurring electrical signals, said detection means comprising clipping means for automatically clipping each of said plurality of electrical signals by an amount based on a predetermined percentage of the maximum amplitude of the most recently occurring information signal appearing in any of said plurality of electrical signals, and means for extracting the information signals from each of the plurality of clipped electrical signals.

6. Detection means for detecting information signals contained in a plurality of simultaneously occurring electrical signals, said detection means comprising signal sampling means to which each of said plurality of electrical signals is fed for sampling the maximum amplitude information signal appearing in any of said electrical signals and for providing a clipping level equal to a predetermined percentage of the maximum amplitude of the most recently occurring information signal, clipping means for automatically clipping each of said plurality of electrical signals in accordance with said clipping level, means for extracting the information signals from the plurality of clipped electrical signals and for producing discrete output pulses in response thereto, each output pulse being initiated substantially at the point of maximum amplitude of each information signal, and means feeding said output pulses to said signal sampling means, said signal sampling means being constructed and arranged so that the output pulses applied thereto determine the periods during which sampling occurs.

7. Detection means for detecting information signals contained in a plurality of simultaneously occurring electrical signals, said detection means comprising first clipping means for automatically performing a first clipping of each of said plurality of electrical signals by an amount based on a predetermined percentage of the instantaneous peak-to-peak amplitude levels thereof, second clipping means for automatically performing a second clipping of each of the plurality of clipped electrical signals obtained after said first clipping by an amount based on a predetermined percentage of the maximum amplitude of the most recently occurring information signal appearing in any of said plurality of clipped signals, and means for extracting the information signals from the twice-clipped electrical signals.

8. Detection means for detecting information signals contained in a plurality of simultaneously occurring electrical signals, said detection means comprising means for bringing each of said electrical signals to approximately the same average peak-to-peak amplitude, first clipping means for automatically performing a first clipping of each of said plurality of electrical signals by an amount based on a predetermined percentage of the instantaneous peak-to-peak amplitude levels thereof, signal sampling means to which each of said plurality of electrical signals is fed after being clipped by said first clipping means, said signal sampling means being constructed and arranged to sample the maximum amplitude information signal appearing in any of said clipped electrical signals and to provide in response thereto a clipping level equal to a predetermined percentage of the maximum amplitude of the most recent information signal, second clipping means to which each of said plurality of electrical signals is also fed after being clipped by said first clipping means, said second clipping means being constructed and arranged to automatically clip each of the clipped electrical signals applied thereto in accordance with said clipping level, means for extracting the information signals from the plurality of twice-clipped electrical signals and for producing discrete output pulses in response thereto, each output pulse being initiated substantially at the point of maximum amplitude of each information signal, and means feeding said output pulses to said signal sampling means, said signal sampling means being further constructed and arranged so that the output pulses applied thereto determine the periods during which sampling occurs.

9. Detection means for detecting information signals contained in an electrical signal comprising sampling means to which said electrical signal is fed for automatically sampling said electrical signal at periods when said information signals are at a maximum to provide a clipping level equal to a predetermined percentage of the maximum amplitude of the most recently occurring information signal, clipping means to which said electrical signal is also fed for automatically clipping said electrical signal in accordance with said clipping level, means for differentiating the clipped electrical signal, means for forming discrete pulses in response to zero crossovers of the differentiated clipped electrical signal when the waveform in the vicinity of a zero crossover has predetermined characteristics, and means feeding said output pulses to said signal sampling means, said signal sampling means being further constructed and arranged so that the output pulses applied thereto determine the periods during which samplings occurs.

10. In a character reading system for translating characters from a record medium, scanning means for scanning said characters and producing an electrical signal having spaced character information signals included therein corresponding to character portions, means for automatically clipping said electrical signals by an amount based on a predetermined percentage of the amplitude of the most recently occurring character information signal, and means for extracting said character information signals from said electrical signal and for producing discrete output pulses in response thereto which represent respective character portions scanned by said scanning means.

11. In a character reading system for translating characters from a record medium, scanning means for scanning said characters and producing an electrical signal having spaced character information signals included therein corresponding to character portions, signal clipping means for automatically clipping said electrical signal by an amount based on a predetermined percentage of the amplitude of the most recently occurring character information signal, means for differentiating the clipped electrical signal, means for forming discrete pulses representing respective character portions in response to predetermined characteristics of the differentiated electrical signal, and means cooperating with said signal clipping means for utilizing said discrete pulses to determine the amplitude of the most recently occurring character information signal.

12. In a character reading system for translating characters from a record medium, scanning means for scanning said characters and for producing an electrical signal having character information signals included therein corresponding to character portions, first clipping means for automatically performing a first clipping of said electrical signal by an amount based on a predetermined percentage of the instantaneous black-white level of said electrical signal, second clipping means for automatically performing a second clipping of the electrical signal obtained after said first clipping by an amount based on a predetermined percentage of the maximum amplitude of the most recently occurring information signal appearing in said electrical signal, means for differentiating the clipped electrical signal, and means for forming discrete output pulses representing character portions in response to predetermined characteristics of the differentiated signal.

13. In a character reading system for translating characters from a record medium, scanning means for scanning said characters and for producing an electrical signal having character information signals included therein corresponding to character portions, signal sampling means for sampling the maximum amplitude of said character information signals and for producing a clipping level equal to a predetermined percentage of the maximum amplitude of the most recently occurring character information signal, clipping means to which said clipping level is fed for automatically clipping said electrical signal in accordance therewith, means for differentiating the clipped electrical signal and for forming discrete output pulses in response to predetermined characteristics of the differentiated electrical signal, and means for feeding said output pulses to said signal sampling means, said signal sampling means being constructed and arranged so that the output pulses applied thereto determine the periods during which said electrical signal is sampled.

14. In a character reading system for translating characters from a record medium, scanning means for scanning said characters and for producing an electrical signal having character information signals included therein corresponding to character portions, first clipping means for automatically performing a first clipping of said electrical signal by an amount based on a predetermined percentage of the instantaneous black-white level of said electrical signal, signal sampling means to which said electrical signal is fed after being clipped by said first clipping means, said signal sampling means being constructed and arranged to sample the maximum amplitude of said character information signals and to produce in response thereto a clipping level equal to a predetermined percentage of the maximum amplitude of the most recent character information signal, second clipping means to which said electrical signal is also fed after being clipped by said first clipping means, said second clipping means being constructed and arranged to automatically perform a second clipping of the clipped electrical signal applied thereto in accordance with said clipping level, means for differentiating the twice-clipped electrical signal and for forming discrete output pulses representing character portions in response to predetermined characteristics of the differentiated electrical signal, and means for feeding said output pulses to said signal sampling means, said signal sampling means being further constructed and arranged so that the output pulses applied thereto determine the periods during which the clipped electrical signal also applied thereto is sampled.

15. In a character reading system for translating characters from a record medium, a plurality of scanning means for producing a plurality of respective electrical signals having character information signals included therein corresponding to respective character portions scanned thereby, clipping means for automatically clipping each of said plurality of electrical signals by an amount based on a predetermined percentage of the maximum amplitude of the most recently occurring character information signal appearing in any of said plurality of electrical signals, and means for extracting said character information signals from the plurality of clipped electrical signals.

16. In a character reading system for translating characters from a record medium, scanning means for producing a plurality of electrical signals having character information signals included therein, means for bringing each of said electrical signals to approximately the same average black-white level, signal sampling means to which each of said plurality of electrical signals is fed for sampling the maximum amplitude character information signal appearing in any of said electrical signals and for providing a clipping level equal to a predetermined percentage of the maximum amplitude of the most recently occurring information signal, clipping means for automatically clipping each of said plurality of electrical signals in accordance with said clipping level, means for extracting the character information signals from the clipped electrical signals and for producing discrete output pulses representing character portions in response thereto, each output pulse being initiated substantially at the point of maximum amplitude of each information signal, and means feeding said output pulses to said signal sampling means, said signal sampling means being constructed and arranged so that the output pulses applied thereto determine the periods during which sampling occurs.

17. In a character reading system for translating characters from a record medium, a plurality of scanning means for producing a plurality of respective electrical signals having character information signals included therein corresponding to respective character portions scanned thereby, first clipping means for automatically performing a first clipping of each of said plurality of electrical signals by an amount based on a predetermined percentage of the instantaneous black-white level thereof, second clipping means for automatically performing a second clipping of the electrical signals obtained after said first clipping by an amount based on a predetermined percentage of the most recently occurring character information signal appearing in any of said electrical signals, and means for extracting the character information signals from the twice-clipped electrical signals to produce signals from which each character can be identified.

18. In an optical character reading system for translating characters from a record medium, a plurality of optical scanning means for producing a plurality of respective electrical signals having character information signals included therein corresponding to respective character portions scanned thereby, means for bringing each of said electrical signals to approximately the same average black-white level, first clipping means for automatically performing a first clipping of each of said plurality of said electrical signals by an amount based on a predetermined percentage of the instantaneous black-white level thereof, signal sampling means to which each of said plurality of electrical signals is fed after being clipped by said first clipping means, said signal sampling means being constructed and arranged to sample the maximum amplitude character information signal appearing in any of said clipped electrical signals and to provide in response thereto a clipping level equal to a predetermined percentage of the maximum amplitude of the most recent information signal, second clipping means to which each of said plurality of electrical signals is also fed after being clipped by said first clipping means, said second clipping means being constructed and arranged to automatically perform a second clipping of each the clipped electrical signals applied thereto in accordance with said clipping level, means for differentiating each of the twice-clipped electrical signals, means for forming discrete output pulses representing character portions in response to predetermined characteristics of the differentiated electrical signals, and means for feeding said output pulses to said signal sampling means, said signal sampling means being further constructed and arranged so that the output pulses applied thereto determine the periods during which sampling occurs.

19. In an optical character reading system, a record medium having a plurality of stylized characters recorded in horizontal rows thereon, each of said characters being stylized to have upper and lower portions spaced in a substantially vertical direction, each portion having substantially vertical character segments located in predetermined ones of a plurality of horizontally adjacent zones into which each character is divided, the stylizing of each of said plurality of characters being such that the substantially vertical segments in the upper and lower portions of each character correspond to a pair of binary numbers which is different for each character, optical scanning means including a rotating drum for progressively scanning said rows in a direction parallel thereto, said rotating drum including a plurality of groups of apertures on its periphery for scanning along a plurality of spaced paths during each scan, said paths being spaced perpendicularly to said row, photo-sensitive means for producing a plurality of electrical signals having character information signals therein corresponding to character portions intercepted by said apertures as a result of scanning along said plurality of spaced paths, means for automatically clipping each of said electrical signals by an amount based on a predetermined percentage of the maximum amplitude of the most recently occurring character information signal appearing in any of said electrical signals, means for differentiating the clipped electrical signals, and means for producing output signals representing vertical character segments in response to predetermined characteristics of the differentiated electrical signals.

20. In an optical character reading system, a record medium having a plurality of stylized characters recorded in horizontal rows thereon, each of said characters being stylized to have upper and lower portions spaced in a substantially vertical direction, each portion having substantially vertical character segments located in predetermined ones of a plurality of horizontally adjacent zones into which each character is divided, the stylizing of each of said plurality of characters being such that the substantially vertical segments in the upper and lower portions of each character corresponds to a pair of binary numbers which is different for each character, optical scanning means including a rotating drum for progressively scanning said rows in a direction parallel thereto, said rotating drum including a plurality of groups of apertures on its periphery for scanning along a plurality of spaced paths during each scan, said paths being spaced perpendicularly to said row, photo-sensitive means for producing a plurality of electrical signals having character information signals therein corresponding to character portions intercepted by said apertures as a result of scanning along said plurality of spaced paths, means to which said electrical signals are fed for bringing each electrical signal to approximately the same average black-white level, first clipping means for automatically performing a first clipping of each of said plurality of said electrical signals by an amount based on a predetermined percentage of the instantaneous black-white level thereof, signal sampling means to which each of said plurality of electrical signals is fed after being clipped by said first clipping means, said signal sampling means being constructed and arranged to sample the maximum amplitude character information signal appearing in any of said clipped electrical signals and to provide in response thereto a clipping level equal to a predetermined percentage of the maximum amplitude of the most recent information signal, second clipping means to which each of said plurality of electrical signals is also fed after being clipped by said first clipping means, said second clipping means being constructed and arranged to automatically perform a second clipping of each the clipped electrical signals applied thereto in accordance with said clipping level, means for differentiating each of the twice-clipped electrical signals, means for forming discrete output pulses representing vertical character segments in response to predetermined characteristics of the differentiated electrical signals, and means for feeding said output pulses to said signal sampling means, said signal sampling means being further constructed and arranged so that the output pulses applied thereto determine the periods during which sampling occurs.

References Cited by the Examiner

UNITED STATES PATENTS

| | | | |
|---|---|---|---|
| 2,419,548 | 4/1947 | Grieg | 328—117 |
| 2,434,921 | 1/1948 | Grieg | 328—117 |
| 2,434,922 | 1/1948 | Grieg | 328—117 |
| 2,890,335 | 6/1959 | Gibbon | 328—171 |
| 2,924,812 | 2/1960 | Merritt et al. | |
| 3,000,000 | 9/1961 | Eldridge. | |
| 3,018,442 | 1/1962 | Goodman | 328—116 |
| 3,028,554 | 4/1962 | Hilliard | 328—117 |

MALCOLM A. MORRISON, *Primary Examiner.*